ISAAC MAYFIELD.
FLOWER PROTECTOR.

No. 116974

PATENTED JUL 11 1871

Witnesses.
F. B. Curtis
Villette Anderson

Inventor.
Isaac Mayfield,
Chipman Hosmer & Co
Attys

UNITED STATES PATENT OFFICE.

ISAAC MAYFIELD, OF MAYFIELD, KENTUCKY.

IMPROVEMENT IN PLANT-PROTECTORS.

Specification forming part of Letters Patent No. 116,974, dated July 11, 1871.

*To all whom it may concern:*

Be it known that I, ISAAC MAYFIELD, of Mayfield, in the county of Graves and State of Kentucky, have invented a new and valuable Improvement in Flower-Protectors; and I do hereby declare that the following is a full, clear, and exact description of the construction and operation of the same, reference being had to the annexed drawing making a part of this specification, and to the letters and figures of reference marked thereon.

Figure 1:
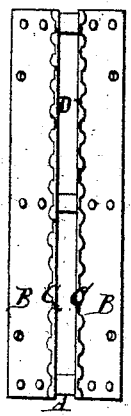
Figure 2:
Figure 3:
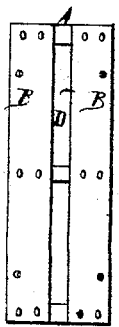
Figure 4:

Figure 1 is a plan view of my invention with pointed projections. Fig. 2 is a vertical section of the same. Fig. 3 is a plan view of plain cover. Fig. 4 is a vertical section of the same.

This invention relates to a flower-protector, which consists of a box or cover having inclined sides and a longitudinal opening at the top between said sides. The lower or under part of this box or cover is open. It is designed to rest on the ground over the young flowers or plants, and allow them to grow upward through the middle opening.

In the accompanying drawing illustrating this invention, A represents the triangular supports, and B the inclined sides adapted and secured thereto. D represents the longitudinal slot along the ridge.

In Figs. 1 and 2, C represents teeth or pointed projections arranged along the upper edges of the sides B. The object of these projections is to deter chickens or other fowls from lighting on and attempting to scratch or otherwise destroy the seeds or plants.

Some of the advantages to be derived from the use of this invention are as follows: Being so nearly closed at the top the plants are secured from being trodden upon or injured by birds or animals. The plants require less attention, because there is so little room for the growth of grass or weeds, and they will retain moisture longer about their roots, after watering, because the sides of the box interfere with evaporation.

This invention is adapted especially to flowers, strawberries, and other small plants or vegetables.

The inclined sides are preferably made of sheet metal, and the projections C are cut in the metal and bent up along each side of the slot D, and away from this slot, so as not to injure the tops of the young plants.

Having described my invention, I claim—

The flower or plant-protector, consisting of the triangular supports A and inclined sides B provided with the projecting points C on each side of the slot or opening D, substantially as herein shown and described.

In testimony that I claim the above I have hereunto subscribed my name in the presence of two witnesses.

ISAAC MAYFIELD.

Witnesses:
G. S. MAYFIELD,
J. E. RIDGWAY.